United States Patent
Cummins

[19]

[11] Patent Number: 6,164,896
[45] Date of Patent: Dec. 26, 2000

[54] TRASH CONTAINER LIFTING AND TRANSPORTING DEVICE

[76] Inventor: Robert L. Cummins, Rte. 2 Box 236, Enfield, N.C. 27823

[21] Appl. No.: 09/517,960

[22] Filed: Mar. 3, 2000

Related U.S. Application Data

[63] Continuation-in-part of application No. 08/986,852, Dec. 8, 1997, Pat. No. 6,033,178.

[51] Int. Cl.$^7$ .................................................. B60R 9/00
[52] U.S. Cl. .......................................... 414/462; 224/521
[58] Field of Search .................................. 224/42.38, 402, 224/519, 520, 521, 543, 545, 553; 414/462, 917

[56] References Cited

U.S. PATENT DOCUMENTS

| | | |
|---|---|---|
| 2,051,265 | 8/1936 | Martin ..................................... 224/553 |
| 2,338,955 | 1/1944 | Metcalf . |
| 2,409,103 | 10/1946 | Cameron . |
| 2,663,474 | 12/1953 | Kelly . |
| 2,930,500 | 3/1960 | Ellis ........................................ 414/462 |
| 3,376,986 | 4/1968 | Farber . |
| 3,740,097 | 6/1973 | Parker et al. . |
| 4,252,492 | 2/1981 | Scothern ................................. 414/541 |
| 4,298,151 | 11/1981 | O'Connor . |
| 4,381,069 | 4/1983 | Kreck .................................. 414/462 X |
| 4,400,129 | 8/1983 | Eisenberg et al. .................. 224/519 X |
| 4,780,044 | 10/1988 | Elskamp .............................. 414/917 X |
| 4,787,809 | 11/1988 | Zrostlik ............................... 414/917 X |
| 4,944,434 | 7/1990 | Hamilton ............................ 224/42.25 |
| 5,209,628 | 5/1993 | Hassell .................................... 414/462 |
| 5,221,173 | 6/1993 | Barnes .................................... 414/346 |
| 5,738,261 | 4/1998 | Dula ....................................... 414/462 |

FOREIGN PATENT DOCUMENTS

| | | | |
|---|---|---|---|
| 1201756 | 9/1965 | Germany ............................... 414/408 |
| 3722184 | 2/1988 | Germany ............................... 414/408 |

*Primary Examiner*—Janice L. Krizek
*Attorney, Agent, or Firm*—MIlls Law Firm, PLLC

[57] ABSTRACT

A trash container lifting device adapted for attachment to a motor vehicle for lifting and transporting a filled trash container to a remote site for pickup is disclosed. The lifting device includes a supporting frame which is attached to the motor vehicle, such as a pickup truck, sport utility vehicle or the like without tools or attaching hardware. The supporting frame is mechanically coupled to an articulating frame for engaging a trash container on the ground surface and lifting it with a manual lever to a raised position for transport by the vehicle. At least one spring extends between the supporting frame and the articulating frame to provide the user with a mechanical advantage in lifting a loaded container which would otherwise be an unmanageable task for a single individual. The lifting device is adaptable to trash containers of various sizes and configurations with minor modifications.

5 Claims, 4 Drawing Sheets

TRASH CONTAINER LIFTING AND TRANSPORTING DEVICE

This is a Continuation-In-Part of U.S. patent Ser. No. 08/986,852 filed Dec. 8, 1997 titled TRASH CONTAINER LIFTING AND TRANSPORTING DEVICE invented by Robert L. Cummins now U.S. Pat. No. 6,033,178.

BACKGROUND OF INVENTION

1. Field of Invention

This invention relates generally to lifting devices and, more particularly, to an apparatus for lifting and transporting a standard residential trash container.

Portable refuse containers or trashcans are a well known fixture of modern residential life. Every homeowner is familiar with the weekly chore of transporting the trashcan to the curbside for pickup by the trash disposal service. This presents a difficult problem for the homeowner whose residence is a substantial distance from the curb.

Although many trash disposal services provide a wheeled container for this purpose, it remains a cumbersome task when the full container must be maneuvered for a substantial distance.

Thus, the present invention has been developed to provide a trash can lifting device which can be conveniently attached to a motor vehicle for transporting a trash container to the curb for pickup.

2. Description of Related Prior Art

U.S. Pat. No. 3,740,097 to Shirley L. Parker et al. discloses a vehicle dump bed for vehicles such as a pickup truck which can be easily mounted on and removed from the vehicle bed. The dump bed is provided with fixtures for lifting a refuse container as the bed is lowered and for transporting the container from one place to another.

U.S. Pat. No. 3,376,986 to H. Farber discloses a detachable garbage can carrier comprising a fixture that is adapted for engaging the handles of a standard cylindrical trash can. The detachable carrier can be mounted on any suitable cart such as a two-wheel shopping cart for transporting the trashcan to the curbside.

U.S. Pat. No. 4,944,434 to Kenneth B. Hamilton discloses an automobile portable hauler for transporting supplies and equipment on the exterior of a conventional motor vehicle. The portable hauler uses brackets that are adapted to fit over the door of the vehicle when the window is open and in a down position.

U.S. Pat. No. 4,298,151 to Brian J. O'Connor discloses a carrier rack for mounting and carrying bicycles on a motor vehicle which includes structures for clamping the rack between the trunk and trunk lid or between some other opening in the automobile and a closure appending to that opening.

U.S. Pat. No. 2,338,955 to Hollis H. Metcalf discloses an automobile carrier adapted for mounting on the rear bumper and trunk of a vehicle which can be positioned to carry various loads thereon.

U.S. Pat. No. 2,409,103 to J.C.A. Cameron discloses an automobile luggage carrier including fixtures for clamping the carrier to the rear bumper and window frame of the vehicle. However, no lifting mechanism is disclosed in this patent.

U.S. Pat. No. 2,663,474 to Edward J. Kelly discloses an outboard motor carrier including fixtures for clamping the carrier between the trunk and trunk lid of a motor vehicle. However, no lifting mechanism is disclosed in this patent.

U.S. Pat. No. 4,252,492 to Clinton Y. Scothern discloses a detachable lift unit for pickup trucks wherein the lifting is readily attached to and detached from the end of the bed of a pickup truck without the use of tools or other apparatus.

Finally, U.S. Pat. No. 5,221,173 to Kevin P. Barnes discloses a multi-vehicle transport system for bulk materials including a primary vehicle operable to go to remote areas and discharge the contents of a standard bin into a hopper, and a secondary load vehicle operable using a hydraulically actuated forklift system to lift and discharge the contents of the hopper from the primary load vehicle into the secondary load vehicle.

SUMMARY OF THE INVENTION

After much research and study of the above described problem, the present invention has been developed to provide a trash container lifting device which can be mounted on the tailgate of a standard pickup truck to engage and lift the trash container for transport by the vehicle.

The lifting device is supported by a pair of J-shaped members which are hung over the tailgate of the pickup truck without the use of tools or other apparatus. The lifting mechanism comprises an articulating frame that pivots downwardly to engage the trash container on the ground and upwardly to lift the container for transport.

The reciprocal lifting movement is accomplished by an elongated handle extending between the support frame and the articulating frame and is assisted by heavy-duty extension springs which provide a mechanical advantage in lifting the load.

In view of the above, it is an object of the present invention to provide a trash container lifting device which will provide a homeowner with a convenient means of lifting and transporting a trash container which could not otherwise be lifted by a single individual.

Another object of the present invention is to provide a trash container lifting device which may be conveniently mounted on a motor vehicle such as a pickup truck without the use of tools or other apparatus.

Another object of the present invention is to provide a trash container lifting device which utilizes a plurality of heavy-duty extension springs to gain a mechanical advantage in lifting the trash container.

Another object of the present invention is to provide a trash container lifting device which is adaptable for use with various standard sized trash containers.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
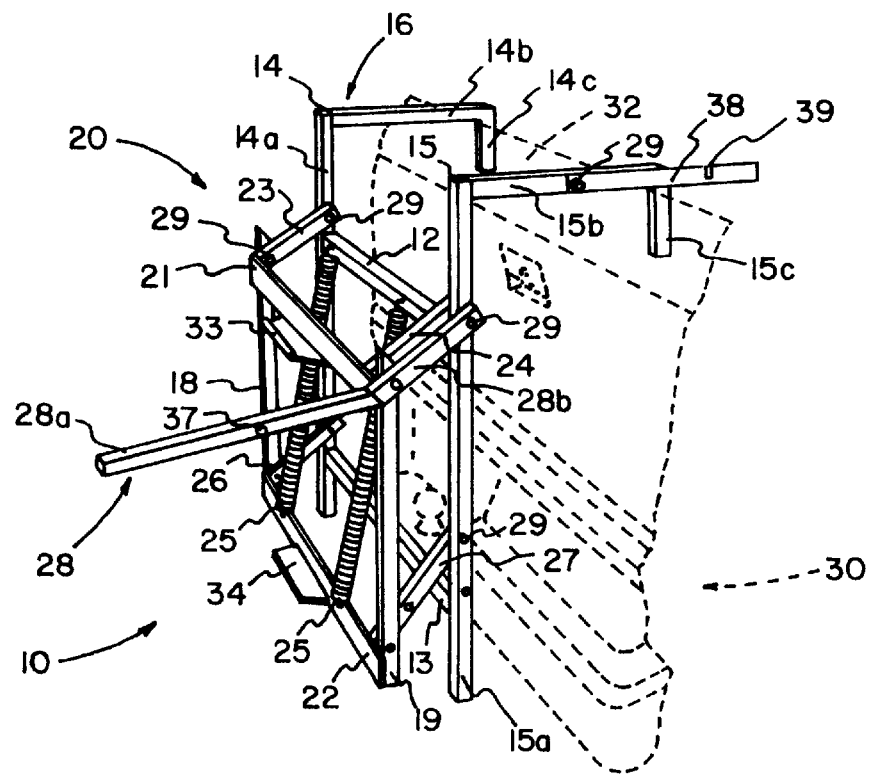
FIG. 1. is a perspective view of the trash container lifting device of the present invention shown mounted on the tailgate of a pickup truck.

With further reference to the drawings, there is shown therein a trash container lifting device in accordance with the present invention, indicated generally at 10 and illustrated in FIG. 1. The lifting device 10 is shown installed on the tailgate 32 at the rear end of a pickup truck, indicated generally at 30, in phantom outline.

In the preferred embodiment, the lifting device 10 is comprised of a supporting frame, indicated generally at 16; an articulating frame, indicated generally at 20; a pair of extension springs 25 and a hand lever indicated generally at 28.

The supporting frame 16 includes a pair of inverted J-shaped members 14 and 15 secured in generally parallel relation by cross members 12 and 13 extending therebetween and being fixedly attached thereto by weldment or attaching hardware.

Each of the J-shaped members 14 and 15 are comprised of a long leg member 14a and 15a, a short leg member 14b and 15b, and a stop member 14c and 15c respectively.

In the preferred embodiment the J-shaped members 14 and 15 are fabricated from rectangular tubing such as steel, aluminum or other suitable material and the component members thereof are joined together by welding.

The short leg members 14b and 15b are fabricated to a predetermined length such that the long leg members 14a and 15a are disposed in generally vertical relation to the ground surface when the supporting frame 16 is positioned over the tailgate 32 of the pickup truck 30 as shown in FIG. 1.

The articulating frame 20 is generally rectangular and comprised of a pair of vertically opposed, tilting brackets 18 and 19 which are interconnected by the upper and lower lift brackets 21 and 22 extending transversely therebetween and being fixedly attached thereto by weldment or attaching hardware.

Figure 3:
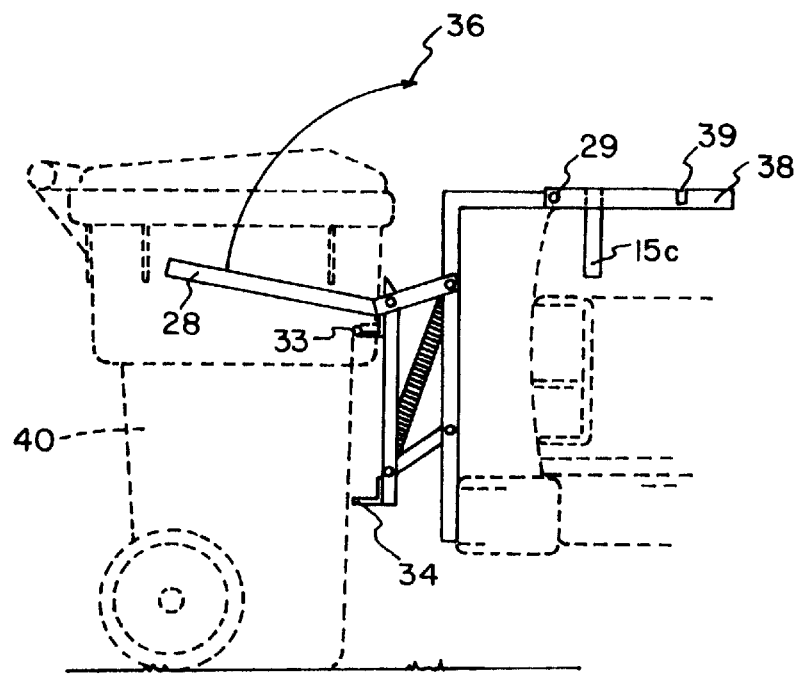
FIG. 3. is a side elevational view of the trash container lifting device engaging a trash container on the ground surface.
Figure 4:
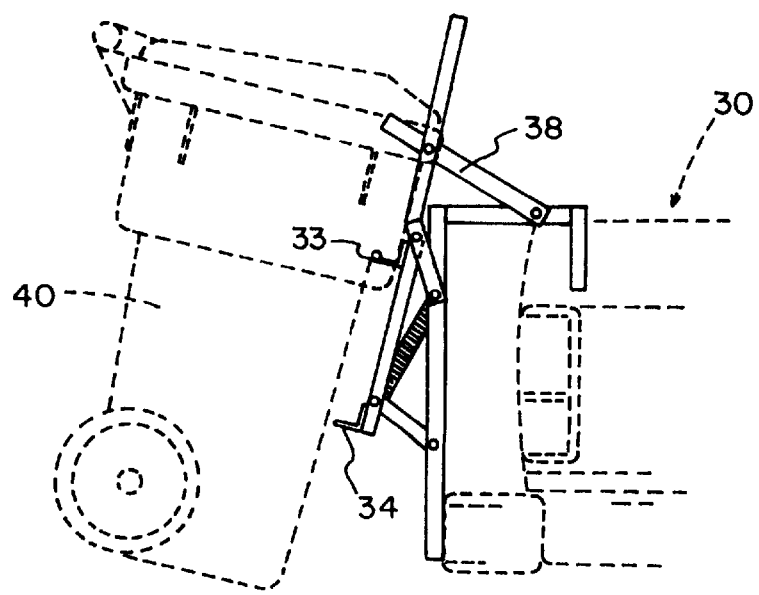
FIG. 4. is a side elevational view of the trash container lifting device shown in a raised position after lifting the trash container off the ground surface.

In the present invention the articulating frame 20 is adapted for reciprocal upward/downward movement in a plane generally parallel to that plane defined by the supporting frame 16 in order to lift a trash container 40 of the type depicted in phantom outline in FIGS. 3 and 4.

The lifting mechanism of the present invention will now be described in detail. The articulating frame 20 is mechanically coupled to the supporting frame 16 by a pair of upper arm brackets 23 and 24 and a pair of lower arm brackets 26 and 27 respectively as illustrated in FIG. 1. More particularly, the upper arm bracket 23 and the lower arm bracket 26 are pivotally attached at one end thereof to the long member 14a of J-shaped member 14 by machine bolts 29 which are inserted through coaxial pivot holes (not shown) formed therein.

The opposite ends of the upper arm bracket 23 and the lower arm bracket 26 are also pivotally attached to the tilting bracket 18 by use of machine bolts 29 extending through coaxial pivot holes (not shown) formed therein.

In similar fashion, the upper arm bracket 24 and the lower arm bracket 27 are pivotally attached at one end thereof to the long member 15a of J-shaped member 15 by the use of machine bolts 29 which extend through coaxial pivot holes (not shown) formed therein.

Similarly, the opposite ends of upper arm bracket 24 and lower arm bracket 27 are pivotally attached to the tilting bracket 19 by the use of machine bolts 29 which extend through coaxial pivot holes (not shown) formed therein.

Of course, other suitable attaching hardware may be utilized to secure the articulating frame 20 to the supporting frame 16 and the embodiment described hereinabove is merely illustrative and is not intended to be restrictive in any sense.

Figure 2:
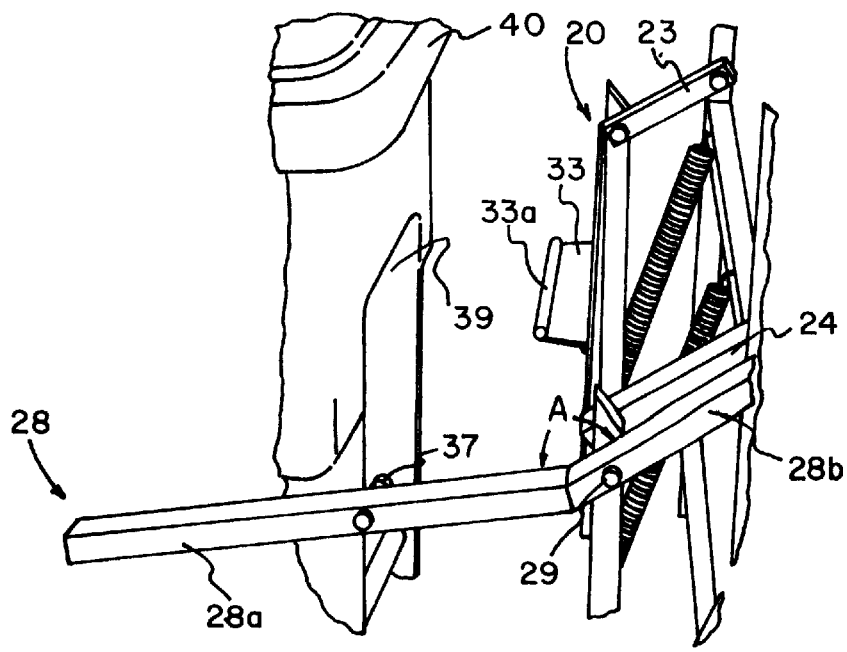
FIG. 2. is a an enlarged perspective view of the trashcan lifting device showing the lifting mechanism in disengaged relationship to a trash container.

It will be noted that an elongated hand lever 28 is provided which consists of a long member 28a and short member 28b as more clearly shown in FIG. 2. In the preferred embodiment the hand lever 28 is also fabricated from a generally rectangular tubing fabricated from steel, aluminum, or other suitable material.

It will be noted that the long member 28a and the short member 28b are joined at a predetermined angle A to provide the optimal lifting leverage to a user of the lifting device 10.

As shown in FIGS. 1 and 2, the short member 28b of the hand lever 28 is pivotally attached in parallel relation to the upper arm bracket 24 by machine bolts 29. In this arrangement it will be appreciated that upward/downward movement of hand lever 28 by a user will produce a corresponding movement of the articulating frame 20 critical to the present invention.

In the preferred embodiment a pair of coiled extension springs 25 are attached at one end thereof to the upper cross member 12 and at an opposite end thereof to the lower lift bracket 22 using suitable attaching hardware.

It will be appreciated by those skilled in the art that the extension springs 25 are fabricated to a predetermined load capacity and overall length to provide a user with the maximum lifting capability during use of the present lifting device.

Since such extension springs are well known to those skilled in the art, further detailed discussion of the same is not deemed necessary.

Still referring to FIG. 1 it can be seen that each of the upper and lower lift brackets 21 and 22 is provided with a foot bracket 33 and 34 respectively which projects outwardly in generally perpendicular relation thereto. In the preferred embodiment each of the foot brackets 33 and 34 are fabricated from a generally rectangular plate of a metal material. Each foot bracket may include a bead or lip as at 33a formed along a forward edge thereof which functions to engage a recessed portion 39 of the trash container 40 as shown in FIG. 2.

Thus, in practical use of the present invention, a user will initially position the lifting device 10 over the tailgate 32 of a pickup truck or other similar vehicle such that the stop members 14c and 15c engage the tailgate 32 and support the lifting device 10 in the position shown.

Next, a trash container 40 is maneuvered into position in proximity to the foot bracket 33 as shown in FIG. 2. It will be appreciated that the box-shaped trash container 40 illustrated in the drawings is of a type often utilized in residential trash disposal service having a capacity ranging from 30 to 95 gallons.

Of course, the lifting device 10 can be adapted to fit various types of trash containers such as cylindrical containers (not shown) with minor modification to the foot brackets 33 and 34.

Such modifications to fit specific trash containers are considered to be within the scope and intended purpose of the present invention.

Next, in the preferred arrangement the user will push downwardly on the hand lever 28 to position the foot bracket 33 at the appropriate vertical height to engage the recess 39 or other mating feature of the trash container 40 as shown in FIG. 3. It will be appreciated by those skilled in the art that in this position the springs 25 are extended and placed under maximum tension by the downward force against the hand lever 28.

Thereafter, the user will push the hand lever 28 upwardly as shown by the directional indicator 36 using manual arm strength in combination with the contraction of springs 25 to raise the trash container 40 to the position illustrated in FIG. 4.

In the embodiment illustrated in FIGS. 3 and 4, it can be seen that the upper foot bracket 33 bears the load of the trash container 40 as the lower foot bracket 34 functions to guide and steady the trash container as it is lifted into position.

Once the trash container 40 has been lifted to the position shown in FIG. 4, a latch 38 is utilized to engage the hand lever 28 to secure it in position. In the preferred embodiment latch 38 is comprised of an elongated steel bar that is pivotally attached to the short member 15b of J-shaped member 15 by a machine bolt 29 extending through coaxial pivot holes (not shown) formed therein.

Latch 38 includes a U-shaped notch 39 formed therein which engages a latch pin 37 projecting from the hand lever 28 in a predetermined position. In this arrangement the latch 38 engages and holds the hand lever 28 supporting the trash container 40 in the raised position shown in FIG. 4.

In the position shown in FIG. 4, the trash container 40 may be conveniently transported by the vehicle to the curbside location for pickup. The user will release the latch 38 and lower the trash container 40 to the ground surface controlling the weight of the load manually with the assistance of the spring resistance provided by the springs 25.

Thereafter, the trash container 40 is easily disengaged from the upper foot bracket 33 and returned to the latched condition shown in FIG. 4 until needed.

In the alternative, the lifting device 10 can be simply removed from the tailgate 32 and placed in the bed of the pickup truck or elsewhere for future use.

Receiver type trailer hitches are well known to those skilled in the art and sometimes are referred to as the Reese® Hitch. A connector having the trailer hitch ball mounted on one end slides into the receiver and a quick-release pin holds the two parts together. By simply pulling the pin, the connector can be removed.

The modified trash container lifting device, indicated generally at 10' includes a hitch connector 50 adapted to slide into the trailer hitch receiver 51. This receiver type trailer hitch is well known to those skilled in the art, and further detailed discussion of the same is not deemed necessary.

On the outer end of the connector 50 is a vertical sleeve 52 secured thereto by weldment or other suitable means.

Aligned openings are provided in the sleeve 52 and are adapted to receive a quick-release pin 53. Since quick-release pins and the use of the same are well known to those skilled in the art, further detailed discussion of the same is not deemed necessary.

A vertical member 54 is adapted to slidingly mount in vertical sleeve 52. A series of aligned openings 55 are provided in vertical member 54 and are adapted to receive the quick-release pin passing through the vertical sleeve 52. Thus it can be seen that the height of the vertical member above the vertical sleeve can be incrementally adjusted.

In the mid portion of the vertical member 54 is a T-shaped trash container engaging bracket 56 secured to such member and rearwardly projecting therefrom. The outer end of the horizontal portion 56' of bracket 56 has a trash container engaging pad 57 attached thereto.

Figure 6:
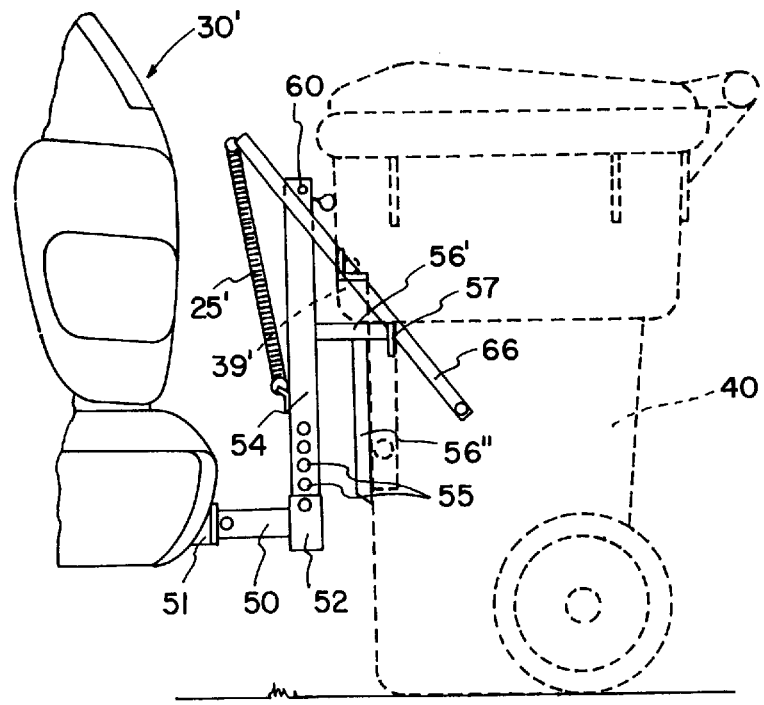
FIG. 6 is a side elevational view showing the modified lifting mechanism engaging a trash container.
Figure 7:
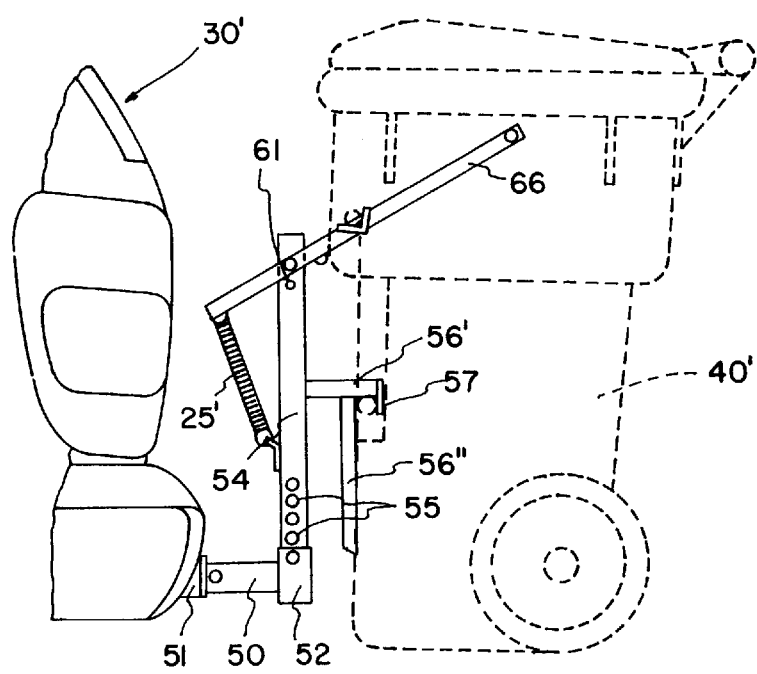
FIG. 7 is a side elevational view showing the trash container lifted by the modified lifting mechanism.

The depending portion 56" of T bracket 56 is adapted to also engage the exterior of the trash container 40' as can clearly be seen in FIGS. 6 and 7.

A U-shaped arm 58 straddles the vertical member 54 and is pivotally mounted thereon as indicated at 59. A counter-balance spring 25' is connected to and extends between the central portion of U-shaped arm 58 and vertical member 54 as clearly seen in FIGS. 6 and 7. Since counter-balance springs are well known to those skilled in the art, further detailed discussion of the same is not deemed necessary.

An upper opening 60 and lower opening 61 are provided above and below pivot 59. A locking pin 62 is mounted on one side of the U-shaped arm 58 and passes therethrough for engagement within the upper or lower lock opening 60 and 61. Locking pin 62 includes a spring 63 which biases said locking pin toward locking engagement with the respective upper and lower openings 60 and 61. Thus it can be seen that the pivoting relationship of the U-shaped arm can be locked either in the down position shown in FIG. 6 for loading of the trash container 40' or can be locked in the carrying position shown in FIG. 7 as will hereinafter be described in greater detail.

A pull cable 64 is connected to the outer end of locking pin 62 and terminates in a pull loop 65. The operation of a locking pin and pull cable will hereinafter be described in greater detail.

Figure 5:
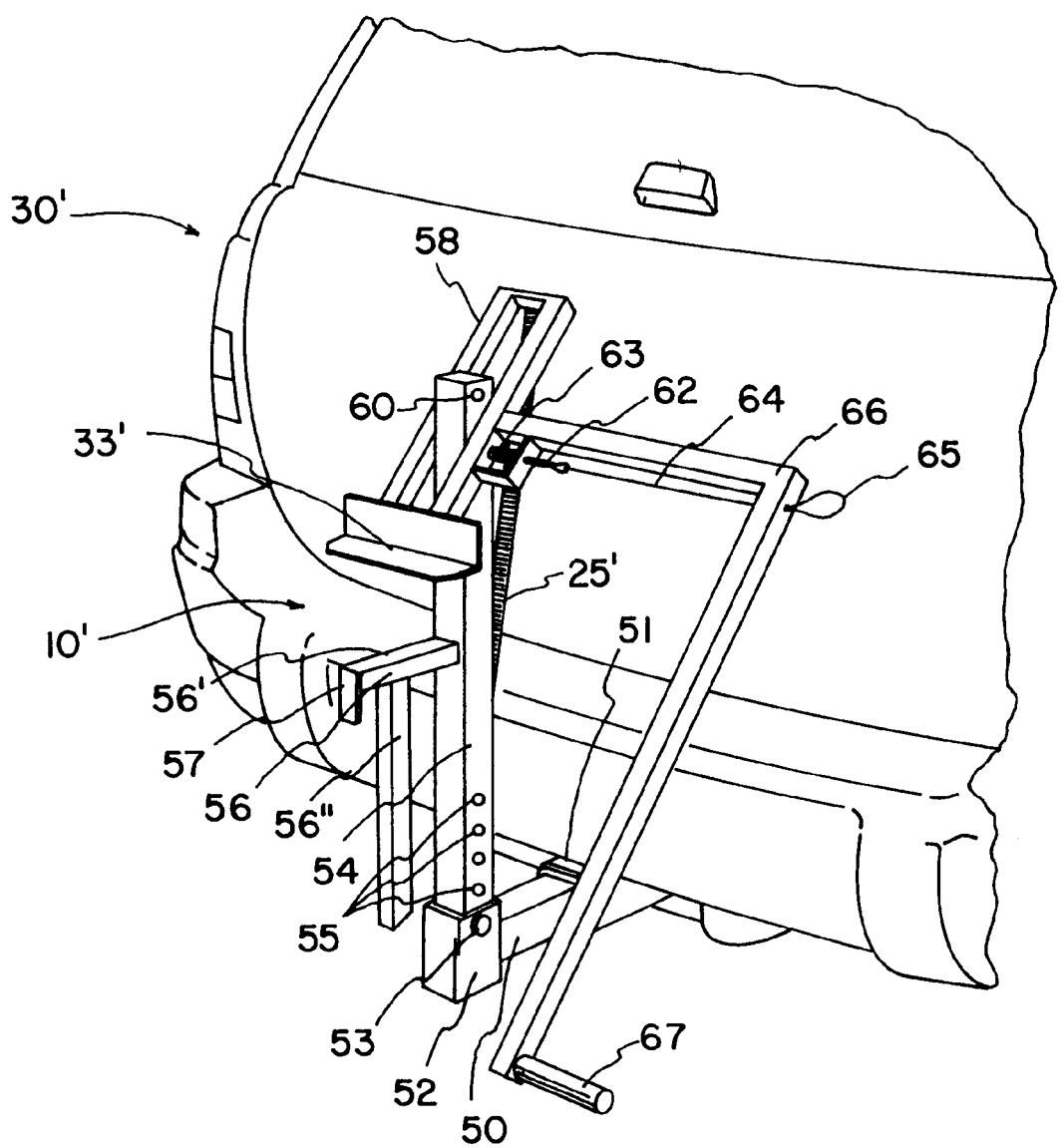
FIG. 5 is a perspective view of a modified trash container lifting device mounted on a receiver type trailer hitch.

One end of an L-shaped arm 66 is fixedly mounted on U-shaped arm 58 as clearly seen in FIG. 5. The opposite end of arm 66 has an outwardly projecting handle 67 mounted thereon. The leg of arm 66 that mounts handle 67 has an opening in the same adjacent the juncture of the legs of such arm with pull cable 64 passing therethrough with pull loop 65 being disposed on the outside thereof, again as clearly seen in FIG. 5. On the open end of the U-shaped arm 58 is an L-shaped-in-cross-section lift bracket 33' fixedly secured thereto. This lift bracket is adapted to engage the notch 39' in the trash container 40' as hereinabove described in conjunction with lifting device 10.

To use the modified trash container lifting device 10' of the present invention, the handle 67 is used to move the L-shaped arm to the position shown in FIGS. 5 and 6 and the pull cable is manipulated so that locking pin 62 is in engagement with lower opening 61 in vertical member 54 with biasing spring 63 holding the locking pin in place.

The trash container 40' is wheeled up to the lift device 10' with the notch 39' of such container coming to engagement with lift bracket 33'. The locking pin 62 is pulled out of engagement with opening 61 in vertical member 54 by pulling loop 65 of cable 64. Handle 67 is then used, through L-shaped arm 66 and counter-balance spring 25', to pivot the lift bracket 33' connected to U-shaped arm 58, from the position shown in FIG. 6 to the position shown in FIG. 7 with locking pin 63 in alignment with opening 60 in vertical member 54. Pressure is then released on pull cable 64 which allows biasing spring 63 to push locking pin 62 into locking engagement with said opening 60.

In this position, the trash container 40' has adequate ground clearance to allow transport by vehicle 30' to the pickup location as hereinabove described for lift 10.

From the above it can be seen that the trash can lifting device of the present invention provides the user with a tool for lifting and transporting a residential trash container over substantial distances to the curbside for pickup.

The trash container lifting device provides the homeowner with a mechanical advantage in lifting a heavy trash container which would otherwise be an unmanageable load for a single person.

The trash container lifting device can be adapted for use with various residential and commercial trash containers which are available in different sizes and configurations.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A trash container lifting and transporting device for use in conjunction with a conventional receiver type trailer hitch comprising:

a connector that operatively engages the receiver of the trailer hitch;

a height adjustable vertical member mounted on said connector;

an arm having a first end and a second end pivotally mounted on the upper portion of said vertical member;

a trash container engaging bracket mounted on the first end of the pivotable arm;

a counter balance spring mounted on the second end of the pivotable arm opposite the trash container engaging bracket;

a manipulating arm fixedly secured to the pivotable arm; and means for locking the pivotable arm in a pivoted lower position and a pivoted upper position whereby a trash container can be moved into a position to engage the container bracket and the manipulating arm used to pivot the pivotable arm to raise the trash container prior to locking the pivotable arm in the upper position for transport to a collection location.

2. The device of claim 1 wherein the vertical member is height adjustable using quick-release pins.

3. The device of claim 1 wherein the trash container engaging bracket is generally L-shaped in cross-section.

4. The device of claim 1 wherein the counter balance spring extends from the end of the pivotal arm opposite the trash container engaging bracket to the height adjustable vertical member.

5. The device of claim 1 wherein the means for locking the pivotal arm relative to the vertical member is a spring loaded pin biased to the lock position.

* * * * *